US012587948B2

(12) United States Patent
Liu et al.

(10) Patent No.: US 12,587,948 B2
(45) Date of Patent: Mar. 24, 2026

(54) TRACKING AREA DETERMINING METHOD, TERMINAL DEVICE, AND CORE NETWORK DEVICE

(71) Applicant: HUAWEI TECHNOLOGIES CO., LTD., Shenzhen (CN)

(72) Inventors: Qiong Liu, Shanghai (CN); Yinghao Jin, Shanghai (CN); Wei Tan, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 174 days.

(21) Appl. No.: 17/400,853

(22) Filed: Aug. 12, 2021

(65) Prior Publication Data

US 2021/0377845 A1 Dec. 2, 2021

Related U.S. Application Data

(63) Continuation of application No. PCT/CN2020/075116, filed on Feb. 13, 2020.

(30) Foreign Application Priority Data

Feb. 15, 2019 (CN) .......................... 201910118064.4

(51) Int. Cl.
*H04W 48/10* (2009.01)
*H04W 8/16* (2009.01)

(52) U.S. Cl.
CPC .............. *H04W 48/10* (2013.01); *H04W 8/16* (2013.01)

(58) Field of Classification Search
CPC ......... H04W 48/10; H04W 8/16; H04W 8/06; H04W 60/04; H04W 68/04; H04W 4/029; H04W 84/06; H04W 16/18
See application file for complete search history.

(56) References Cited

U.S. PATENT DOCUMENTS 9,060,347 B2 6/2015 Vaidya et al.
9,271,116 B1 * 2/2016 Li .......................... H04W 4/029
(Continued)

FOREIGN PATENT DOCUMENTS

CN 101925174 A 12/2010
CN 102395120 A 3/2012
(Continued)

OTHER PUBLICATIONS

Thales, et al., NR-NTN: Preliminary solutions for NR to support non-terrestrial networks, Jun. 2018, 3GPP TSG, RAN Meeting #80 , pp. 1-4 (Year: 2018).*
(Continued)

*Primary Examiner* — Noel R Beharry
*Assistant Examiner* — Angelie T Ngo
(74) *Attorney, Agent, or Firm* — Fish & Richardson P.C.

(57) ABSTRACT

Methods for determining a tracking area is provided. One example method includes sending, by a terminal device, indication information to a core network device, where the indication information is used to indicate a position of the terminal device; and receiving, by the terminal device, first TA information from the core network device, where the first TA information includes a TA corresponding to the position of the terminal device, and the TA is determined based on the position of the terminal device. In the foregoing technical solution, the tracking area of the terminal device is managed based on the position of the terminal device, and the tracking area of the terminal device can be managed without depending on a cell ID change of the terminal device.

17 Claims, 9 Drawing Sheets

(56)                    References Cited

U.S. PATENT DOCUMENTS

| | | | | |
|---|---|---|---|---|
| 9,877,204 B1 * | 1/2018 | Vivanco | ................ | H04W 16/18 |
| 11,363,413 B2 * | 6/2022 | Ljung | ................... | H04W 64/00 |
| 2007/0275707 A1 * | 11/2007 | Kwak | ................... | H04W 60/04 |
| | | | | 455/414.2 |
| 2014/0155109 A1 | 6/2014 | Vaidya et al. | | |
| 2017/0339572 A1 * | 11/2017 | Liang | .................... | H04W 16/18 |
| 2021/0212014 A1 * | 7/2021 | Gao | ....................... | H04W 48/12 |
| 2021/0377909 A1 * | 12/2021 | Chen | ..................... | H04W 4/029 |
| 2021/0409900 A1 * | 12/2021 | Wang | ................... | H04W 48/16 |
| 2022/0052753 A1 * | 2/2022 | Speidel | ................... | H04W 4/02 |
| 2022/0086713 A1 * | 3/2022 | Määttänen | ...... | H04W 36/00837 |
| 2022/0150818 A1 * | 5/2022 | Liberg | ............... | H04B 7/18539 |

FOREIGN PATENT DOCUMENTS

| | | | | | |
|---|---|---|---|---|---|
| CN | 104427476 | A | | 3/2015 | |
| CN | 107404760 | A | * 11/2017 | ........... | H04W 68/04 |
| CN | 107770863 | A | | 3/2018 | |
| CN | 108024332 | A | | 5/2018 | |
| CN | 108040367 | A | | 5/2018 | |
| WO | 2017018838 | A1 | | 2/2017 | |

OTHER PUBLICATIONS

Extended European Search Report issued in European Application No. 20755563.2 on Feb. 22, 2022, 13 pages.

Thales, Nokia, Nokia Shanghai Bell, HNS, "NR-NTN: Preliminary solutions for NR to support non-terrestrial networks," 3GPP TSG RAN Meeting #80, RP-180664, La Jolla, USA, Jun. 11-14, 2018, 16 pages.

ZTE Corporation, Sanechips, "Consideration on TA management in NTN," 3GPP TSG-RAN WG2 Meeting#105, R2-1900829, Athens, Greece, Feb. 25-Mar. 1, 2019, 4 pages.

ZTE, Sanechips, "Tracking Area Management and Paging Handling in NTN," 3GPP TSG-RAN WG3 #102, R3-186328, Spokane, WA, USA, Nov. 12-16, 2018, 13 pages.

Zte et al., "Tracking Area Management and Paging Handling in NTN," 3GPP TSG RAN WG3#103, R3-190139, Athens, Greece, Feb. 25-Mar. 1, 2019, 16 pages.

3GPP TR 38.821 V0.3.0 (Nov. 2018), "3rd Generation Partnership Project; Technical Specification Group Radio Access Network; Solutions for NR to support non-terrestrial networks (NTN) (Release 16)," Dec. 2018, 33 pages.

Zte et al., "Discussion on Tracking Area Management in NTN," 3GPP TSG-RAN WG3 #101bis, R3-185610, Chengdu, China, Oct. 8-12, 2018, 8 pages.

Nokia et al., "Tracking Area considerations for NTN," 3GPP TSG-RAN WG2 Meeting #104, R2-1817606, Spokane, USA, Nov. 12-16, 2018, 2 pages.

Office Action in Chinese Application No. 201910118064.4, dated Dec. 15, 2020, 11 pages.

Search Report in Chinese Application No. 201910118064.4, dated Dec. 4, 2020, 3 pages.

PCT International Search Report and Written Opinion in International Application No. PCT/CN2020/075116, dated May 8, 2020, 15 pages.

* cited by examiner

TRACKING AREA DETERMINING METHOD, TERMINAL DEVICE, AND CORE NETWORK DEVICE

CROSS-REFERENCE TO RELATED APPLICATIONS

This application is a continuation of International Application No. PCT/CN2020/075116, filed on Feb. 13, 2020, which claims priority to Chinese Patent Application No. 201910118064.4, filed on Feb. 15, 2019. The disclosures of the aforementioned applications are hereby incorporated by reference in their entireties.

TECHNICAL FIELD

This application relates to the communication field, and more specifically, to a tracking area determining method, a terminal device, and a core network device.

BACKGROUND

A mobile network uses a tracking area (tracking area, TA) to track a position of a terminal device, to manage the position of the terminal device and page the terminal device. In terrestrial network planning, the TA is bound to a geographical position. Once a terrestrial network device is deployed, a position is fixed. Therefore, one TA is usually a set of several cells of network devices, and all cells within a range of the TA broadcast a same tracking area code (tracking area code, TAC) to the terminal device. After leaving the TA, the terminal device receives broadcast information from a cell in another TA. After receiving a TAC different from all TACs (configured by the network device for the terminal device) in a TA list, the terminal device initiates a tracking area update (tracking area update, TAU) request to the network device, to notify the network device that the terminal device has changed the position and entered a new TA area. In this case, the network device updates the TA list, adds the new TA to the TA list, and notifies the terminal device. When there is a paging requirement of a user, the network device delivers a paging message to cells in all TAs in a TA list by using the TA list, to search for the terminal device.

However, in a non-terrestrial network (non terrestrial networks, NTN) scenario, when an air-borne platform (for example, a satellite) carries load having all functions of an access network device or load (for example, a distributed unit (distributed unit, DU)) having a portion of the functions of the access network device to move in the air, a cell of the access network device in the air moves together with the air-borne platform and sweeps the around. From a perspective of the terrestrial terminal device, even if the terminal device does not move, a covered cell changes continuously. In this case, the geographical position and the cell are no longer bound, and a cell ID change of the terminal device cannot be used as a basis for determining update of the TA of the terminal device.

Therefore, in the NTN scenario, how to determine the tracking area of the terminal device becomes a problem that needs to be urgently resolved.

SUMMARY

This application provides a tracking area determining method, a terminal device, and a core network device, to determine a tracking area of the terminal device in an NTN scenario.

According to a first aspect, this application provides a tracking area determining method. The method includes: sending, by a terminal device, indication information to a core network device, where the indication information is used to indicate a position of the terminal device; and receiving, by the terminal device, first TA information from the core network device, where the first TA information includes a TA corresponding to the position of the terminal device, and the TA is determined based on the position of the terminal device.

In the foregoing technical solution, the tracking area of the terminal device is managed based on the position of the terminal device, so that the tracking area of the terminal device can be managed without depending on a cell ID change of the terminal device. In other words, the cell ID change of the terminal device is no longer used as a basis for determining update of the TA of the terminal device, but an absolute position of the terminal device is used as the basis for determining update of the TA of the terminal device, so that the tracking area of the terminal device can be determined in an NTN scenario.

In a possible implementation, the sending, by a terminal device, indication information to a core network device includes: sending, by the terminal device, the indication information to the core network device when the position of the terminal device is beyond a range covered by all TAs indicated by second TA information, where the second TA information is TA information currently used by the terminal device.

In the foregoing technical solution, the terminal device initiates position update only when the terminal device is beyond a range covered by all TAs indicated by original TA information, so that frequent sending of the indication information can be avoided.

In a possible implementation, the sending, by a terminal device, indication information to a core network device includes: sending, by the terminal device, a position update request to the core network device, where the position update request includes the indication information.

In the foregoing technical solution, the indication information is sent by reusing, the position update request, so that signaling interworking between the terminal device and the core network device can be reduced, and this is easy to implement.

In a possible implementation, the indication information includes the position of the terminal device, and the method further includes: receiving, by the terminal device, broadcast information sent by an access network device, where the broadcast information is used to indicate a TA determining manner of the terminal device.

In the foregoing technical solution, the terminal device determines e tracking area determining manner by using a broadcast message. In this way, different tracking area determining manners may be used for different scenarios, so that the determined tracking area is more accurate.

In a possible implementation, the method further includes: sending, by the terminal device, a type of the terminal device to the core network device, where the type is a fixed terminal device FT or a mobile terminal device MT.

In the foregoing technical solution, the core network device may configure, for different types of terminal devices, TAs having different ranges. For example, a TA of the FT is smaller, and a TA of the MT is larger. In this way, paging resources can be properly allocated.

In a possible implementation, the indication information includes the TA corresponding to the position of the terminal device; and before the sending, by a terminal device, indication information to a core network device, the method further includes: determining, by the terminal device based on the position of the terminal device, the TA corresponding to the position of the terminal device.

In the foregoing technical solution, the terminal device determines the TA at the position of the terminal device. Because the terminal device clearly knows the position of the terminal device, a range of the TA can be more accurately determined.

In a possible implementation, the method further includes: receiving, by the terminal device, broadcast information sent by an access network device, where the broadcast information is used to indicate a tracking area determining manner of the terminal device and a TA setting parameter; and determining, by the terminal device based on the position of the terminal device, the determining manner, and the setting parameter, the TA corresponding to the position of the terminal device.

In a possible implementation, the determining, by the terminal device based on the position of the terminal device, the determining manner, and the setting parameter, the TA corresponding to the position of the terminal device includes: determining, by the terminal device based on the position of the terminal device, the determining manner, the setting parameter, and a type of the terminal device, the TA corresponding to the position of the terminal device, where the type is a fixed terminal device FT or a mobile terminal device MT.

In the foregoing technical solution, the terminal device may configure, for different types of terminal devices, TAs having different ranges. For example, a TA of the FT is smaller, and a TA of the MT is larger. In this way, paging resources can be properly allocated.

In a possible implementation, the determining, by the terminal device based on the position of the terminal device, the TA corresponding to the position of the terminal device includes: obtaining, by the terminal device by using a minimum circle coverage algorithm for at least a portion if historical positions of the terminal device and the position of the terminal device, the TA corresponding to the position of the terminal device.

In the foregoing technical solution, the TA corresponding to the position of the terminal device is obtained by using the minimum circle coverage algorithm, and this is simple and easy to implement.

In a possible implementation, the first TA information includes a center and a radius of the TA corresponding to the position of the terminal device, and the second TA information includes a center and a radius of each of all the TAs.

In a possible implementation, TAs indicated by the first TA information and the second TA information are circles or polygons.

According to a second aspect, this application provides a tracking area determining method. The method includes: receiving, by a core network device, indication information sent by a terminal device, where the indication information is used to indicate a position of the terminal device; and sending, by the core network device, first TA information to the terminal device, where the first TA information includes a TA corresponding to the position of the terminal device, and the TA is determined based on the position of the terminal device.

In the foregoing technical solution, the tracking area of the terminal device is managed based on the position of the terminal device, so that the tracking area of the terminal device can be managed without depending on a cell ID change of the terminal device. In other words, the cell ID change of the terminal device is no longer used as a basis for determining update of the TA of the terminal device, but an absolute position of the terminal device is used as the basis for determining update of the TA of the terminal device, so that the tracking area of the terminal device can be determined in an NTN scenario.

In a possible implementation, the receiving, by a core network device, indication information sent by a terminal device includes: receiving, by the core network device, a position update request sent by the terminal device, where the position update request includes the indication information.

In the foregoing technical solution, the indication information is sent by reusing the position update request, so that signaling interworking between the terminal device and the core network device can be reduced, and this is easy to implement.

In a possible implementation, the method further includes: restarting, by the core network device, a TA setting procedure for the terminal device when a minimum distance between the position of the terminal device and a range covered by all TAs indicated by second TA information is greater than or equal to a preset threshold.

In other words, a maximum tracking area is set for the terminal device. If the tracking area of the terminal device is beyond the maximum tracking area (for example, the terminal device roams), the core network device may use a TA setting parameter to reset a new TA for the terminal device. In this way, a problem of excessively high paging costs caused by an excessively large tracking area of the terminal device can be avoided.

In a possible implementation, the first TA information includes a center and a radius of the TA corresponding to the position of the terminal device, and the second TA information includes a center and a radius of each of all the TAs.

In a possible implementation, TAs indicated by the first TA information and the second TA information are circles or polygons.

In a possible implementation, the method further includes: determining, by the core network device, one or more cells in the TA corresponding to the position of the terminal device; and performing, by the core network device, paging in the one or more cells.

In a possible implementation, the indication information includes the position of the terminal device, and the method further includes: determining, by the core network device based on the position of the terminal device, the TA corresponding to the position of the terminal device. In a possible implementation, the determining, by the core network device based on the position of the terminal device, the TA corresponding to the position of the terminal device includes: obtaining, by the core network device by using a minimum circle coverage algorithm for at least a portion of all historical positions reported by the terminal device and the position of the terminal device, the TA corresponding to the position of the terminal device.

In the foregoing technical solution, the TA corresponding to the position of the terminal device is obtained by using the minimum circle coverage algorithm, and this is simple and easy to implement.

In a possible implementation, the method further includes: receiving, by the core network device, a type that is of the terminal device and that is sent by a terminal device, where the type is a fixed terminal device FT or a mobile terminal device MT; and determining, by the core network device based on the position of the terminal device and the type of the terminal device, the TA corresponding to the position of the terminal device.

In the foregoing technical solution, the core network device may configure, for different types of terminal devices, TAs having different ranges. For example, a TA of the FT is smaller, and a TA of the MT is larger. In this way, paging resources can be properly allocated.

According to a third aspect, this application provides a terminal device, including modules configured to perform any one of the first aspect or the implementations of the first aspect.

According to a fourth aspect, this application provides a core network device, including modules configured to perform any one of the second aspect or the implementations of the second aspect.

According to a fifth aspect, this application provides a terminal device, including a transceiver, a processor, and a memory, configured to perform the method according to any one of the first aspect or the implementations of the first aspect.

According to a sixth aspect, this application provides a core network device, including a transceiver, a processor, and a memory, configured to perform the method according to any one of the second aspect or the implementations of the second aspect.

According to a seventh aspect, this application provides a chip. The chip is connected to a memory, and is configured to read and execute a software program stored in the memory, to implement the method according to any one of the first aspect or the implementations of the first aspect.

According to an eighth aspect, this application provides a chip. The chip is connected to a memory, and is configured to read and execute a software program stored in the memory, to implement the method according to any one of the second aspect or the implementations of the second aspect.

According to a ninth aspect, this application provides a computer-readable storage median, including instructions. When the instructions are run on a terminal device, the terminal device is enabled to perform the method according to any one of the first aspect or the implementations of the first aspect.

According to a tenth aspect, this application provides a computer-readable storage medium, including instructions. When the instructions are run on a core network device, the core network device is enabled to perform the method according to any one of the second aspect or the implementations of the second aspect.

According to an eleventh aspect, this application provides a computer program product. When the computer program product runs on a terminal device, the terminal device is enabled to perform the method according to any one of the first aspect or the implementations of the first aspect.

According to a twelfth aspect, this application provides a computer program product. When the computer program product runs on a core network device, the core network device is enabled to perform the method according to any one of the second aspect or the implementations of the second aspect.

DESCRIPTION OF EMBODIMENTS

Figure 1:
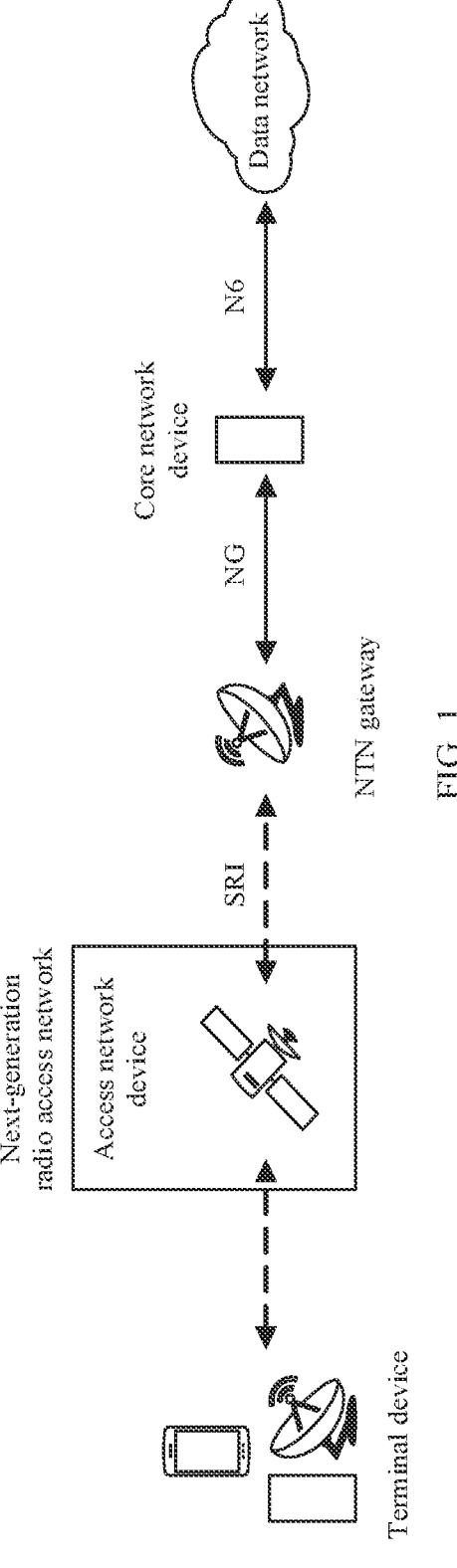
FIG. 1 is a schematic diagram of a scenario to which an embodiment of this application may be applied.

The following describes technical solutions in this application with reference to accompanying drawings.

The technical solutions in the embodiments of this application may be applied to various communication systems, such as a global system for mobile communication (global system for mobile communications, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LIE time division duplex (time division duplex, TDD) system, a universal mobile telecommunication system (universal mobile telecommunication system, UMTS), a worldwide interoperability for microwave access (worldwide interoperability for microwave access, WiMAX) communication system, a future 5th generation (5th generation, 5G) system, or a new radio (new radio, NR) system.

A terminal device in the embodiments of this application may be user equipment, an access terminal, a subscriber unit, a subscriber station, a mobile station, a mobile station, a remote station, a remote terminal, a mobile device, a user terminal, a terminal, a wireless communication device, a user agent, a user apparatus, or the like. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. This is not limited in the embodiments of this application.

A core network device in the embodiments of this application may be a device configured to communicate with the terminal device. The network device may be a base transceiver station (base transceiver station, BTS) in the global system for mobile communication (global system for mobile communications, GSM) system or the code division multiple access (code division multiple access, CDMA) system, a NodeB (NodeB, NB) in the wideband code division multiple access (wideband code division multiple access, WCDMA) system, an evolved NodeB (evolved NodeB, eNB or eNodeB) in the LTE system, or a radio controller in a cloud radio access network (cloud radio access network, CRAN) scenario. Alternatively, the network device may be a relay station, an access point, a vehicle-mounted device, a wearable device, a network device in the future 5G network, a network device in the future evolved PLMN network, or the like. This is not limited in the embodiments of this application. Optionally, the core network device may be an access and mobility management function (access and mobility management function, AMF) network element in a 5G communication system.

In the embodiments of this application, the terminal device or the network device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (which is also referred to as a main memory). The operating system may be any one or more computer operating systems that implement service processing by using a process (process), for example, a Linux operating system, a Unix operating system, an Android operating system, an iOS operating system, or a windows operating system. The application layer includes applications such as a browser, an address hook, word processing software, and instant communication software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by the terminal device or the network device, or a function module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (compact disc, CD) and a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel and various other media that can store, contain, and/or carry instructions and/or data.

FIG. 1 is a schematic diagram of a scenario to which an embodiment of this application may be applied. As shown in FIG. 1, an air-borne platform carries load having all functions of an access network device, a terminal device is connected to the access network device by using an air interface, the air-borne platform communicates with an NTN gateway by using an interface (for example, a satellite radio interface (satellite radio interface, SRI)), the NTN gateway communicates with a core network device by using an interface (for example, an NG interface), and the core network device communicates with a data network by using an interface (for example, an N6 interface). In this way, the access network device establishes a wireless feedback link with the core network device by using a ground NTN gateway.

Figure 2:
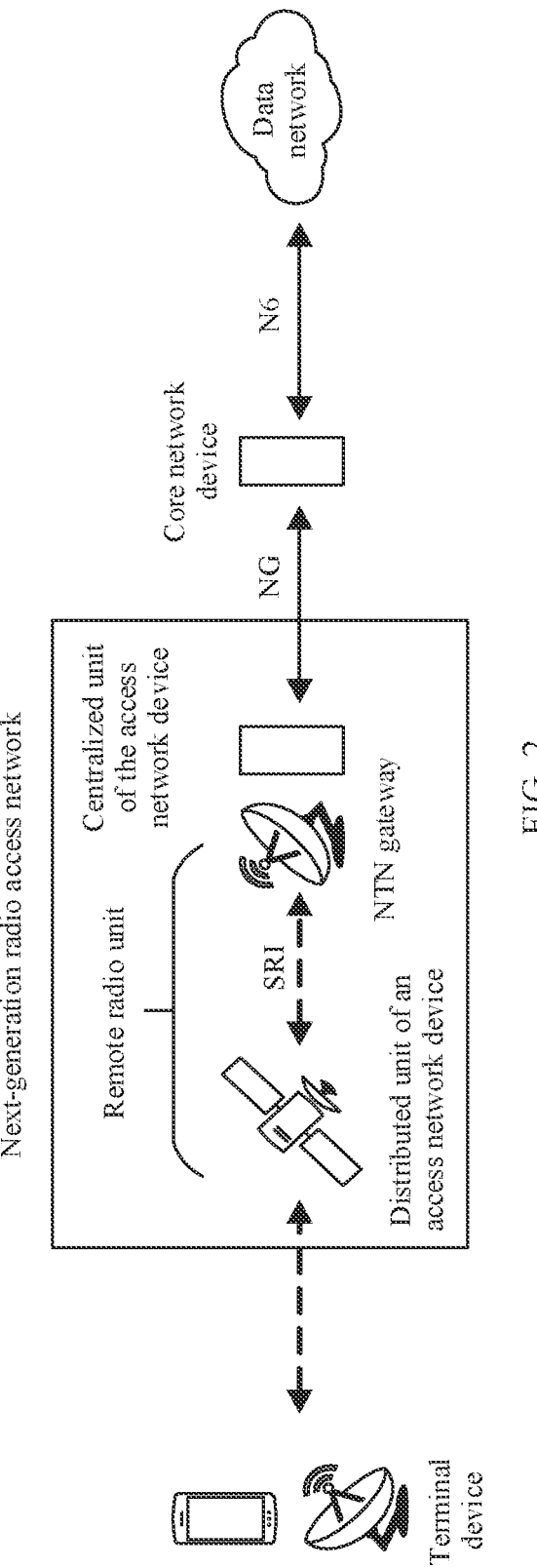
FIG. 2 is a schematic diagram of another scenario to which an embodiment of this application may be applied.

FIG. 2 is a schematic diagram of another scenario to which an embodiment of this application may be applied. As shown in FIG. 2, when an access network device uses a centralized unit (centralized unit, CU)-distributed unit (distributed unit, DU) architecture, the DU is carried on an air-borne platform (that is, load carried by the air-borne platform is the DU), and the CU is deployed on the ground. A remote radio unit includes the air-borne platform and an NTN gateway. A next-generation radio access network includes the air-borne platform, the NTN gateway, and the CU on the ground. A terminal device is connected to the air-borne platform by using an air interface, the air-borne platform communicates with the NTN gateway by using an interface (for example, an SRI), the CU communicates with a core network device by using an interface (for example, an NG interface), and the core network device communicates with a data network by using an interface (for example, an N6 interface) In this way, the DU in the air establishes a wireless feedback link with the CU by using a ground NTN gateway.

It should be noted that the air-home platform in FIG. 1 and FIG. 2 may be an air platform whose running orbit is determined, for example, a satellite, an unmanned aerial vehicle, a hot air balloon, or an aircraft, or may be a ground platform whose running orbit is determined, for example, a bus or a ship whose track is determined. This is not limited in the embodiments of this application. The NTN gateway is a node at a transport network layer (transport Network layer, TNL), and is configured to implement transparent transmission of data or signaling. The NTN gateway may alternatively be replaced with a receiving node or a donor node that is at a fixed position.

It should be understood that FIG. 1 and FIG. 2 are merely examples. The technical solutions in the embodiments of this application may alternatively be applied to another scenario, provided that a tracking area of a terminal device needs to be determined in this scenario.

In an NTN scenario, when an air-borne platform carries load having all functions of an access network device or load having a portion of the functions of the access network device to move in the air, a cell of the access network device in the air moves together with the air-borne platform and sweeps the ground. From a perspective of the terrestrial terminal device, even if the terminal device does not move, a covered cell changes continuously. In this case, a geographical position and the cell are no longer bound, and a cell ID change of the terminal device cannot be used as a basis for determining update of the TA of the terminal device. Therefore, in the NTN scenario, how to determine the tracking area of the terminal device becomes a problem that needs to be urgently resolved.

For the foregoing problem, the embodiments of this application provide a tracking area determining method, to determine the tracking area of the terminal device in the NTN scenario.

Figure 3:
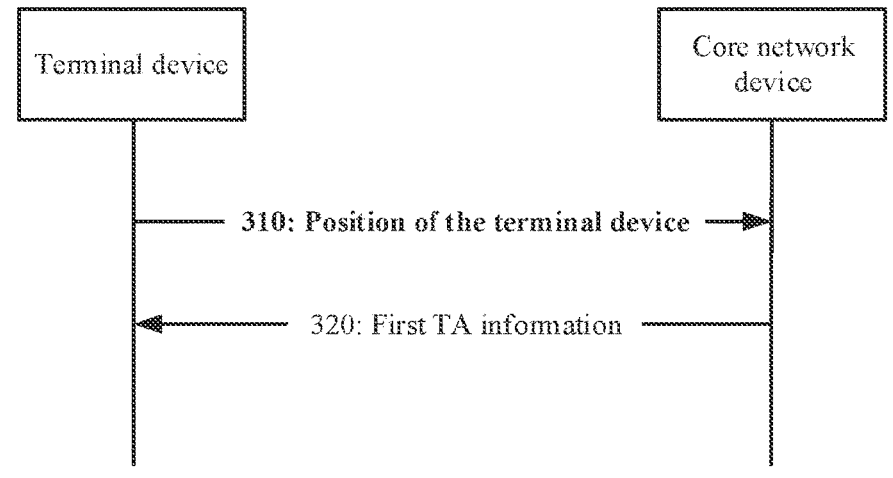
FIG. 3 is a schematic flowchart of a tracking area determining method according to an embodiment of this application.

FIG. 3 is a schematic flowchart of a tracking area determining method according to an embodiment of this application. The method shown in FIG. 3 may include at least a portion of the following content.

In 310, a terminal device sends indication information to a core network device, where the indication information is used to indicate a position of the terminal device, and the position of the terminal device is used to determine a TA corresponding to the position of the terminal device.

A type of the terminal device is not specifically limited in this embodiment of this application, provided that the terminal device can determine the position of the terminal device and communicate with the core network device. For example, the terminal device may be a terminal device that has a positioning function.

The position of the terminal device may be information that can reflect a geographical position of the terminal device. In an example, the position of the terminal device may be the geographical position (for example, latitude and longitude coordinates) of the terminal device. In another example, the position of the terminal device may be a TA corresponding to the geographical position of the terminal device or the like. In other words, in this case, the position of the terminal device may refer to an area or a range of the terminal device, instead of latitude and longitude coordinates of the terminal device.

It should be understood that the position of the terminal device in this embodiment of this application is the geographical position (also referred to as an absolute position) of the terminal device, for example, a geographical position obtained by the terminal device that has the positioning function positioning the terminal device.

A shape of the TA is not specifically limited in this embodiment of this application. For example, the TA may be a circle, a polygon, an irregular shape, or the like.

A specific representation form of the TA is related to the shape of the TA. For example, when the TA is the circle, the TA may be represented by a center of the circle and a radius, the center of the circle and a diameter, three different points on the circle, and the like. When the TA is the polygon, the TA may be represented by a side length and a center of the polygon, a diagonal and the center of the polygon, and the like.

In 320, the terminal device receives first tracking area TA information from the core network device, where the first TA information includes the TA corresponding to the position of the terminal device, and the TA is determined based on the position of the terminal device.

A type of the core network device is not specifically limited in this embodiment of this application, provided that the core network device can communicate with the terminal device and manage the position of the terminal device. For example, the core network device may be an AMF network element in 5G, a mobility management entity (mobility management entity, MME) in 4G, or the like.

The core network device may send the first TA information by sending a position update response message. The first TA information may include one TA or a set of a plurality of TAs. For example, the first TA information may be in a form of a TA list (TA list).

It may be understood that, when the terminal device is within a service range of load that is carried by an air-borne platform and that has a function of an access network device, the terminal device communicates with the core network device by using the load that is carried by the air-borne platform and that has the function of the access network device. Specifically, the terminal device sends the indication information to the load that is carried by the air-borne platform and that has the function of the access network device, and the load that is carried by the air-borne platform and that has the function of the access network device transparently transmits the indication information to the core network device. Similarly, the core network device sends the first TA information to the load that is carried by the air-home platform and that has the function of the access network device, and then the load that is carried by the air-borne platform and that has the function of the access network device transparently transmits the first TA information to the terminal device.

In the foregoing technical solution, the tracking area of the terminal device is managed based on the position of the terminal device, so that the tracking area of the terminal device can be managed without depending on a cell ID change of the terminal device. In other words, the cell ID change of the terminal device is no longer used as a basis for determining update of the TA of the terminal device, but the absolute position of the terminal device is used as the basis for determining update of the TA of the terminal device, so that the tracking area of the terminal device can be determined in an NTN scenario.

In some embodiments, the terminal device may alternatively send the indication information to the core network device only when the position of the terminal device is beyond a range covered by all TAs indicated by second TA information. After receiving the indication information sent by the terminal device, the core network device updates the second TA information to form first TA information, and sends the first TA information to the terminal device. The second TA information may include one TA or a set of a plurality of TAs. For example, the second TA information may be in a form of a TA list (TA list).

In some other embodiments, the terminal device may periodically send the indication information.

Optionally, after receiving the indication information sent by the terminal device, the core network device determines the TA corresponding to the position of the terminal device, and determines whether information about the TA corresponding to the position of the terminal device is in the second TA information. If determining that the TA corresponding to the position of the terminal device is in the second TA information, the core network device determines the second TA information as the first TA information, and sends the first TA information to the terminal device, or the core network device does not send the first TA information. If determining that the information about the TA corresponding to the position of the terminal device is not in the second TA information, the core network device adds, to the second TA information, the information about the TA corresponding to the position of the terminal device, to form the first TA information, and sends the first TA information to the terminal device.

It may be understood that the second TA information is TA information currently used by the terminal device, and the first TA information is TA information obtained after TA update is performed, and is TA information used in next time of determining.

In this embodiment of this application, there are many manners of triggering the terminal device to determine the position of the terminal device.

In an example, the terminal device may periodically determine the position of the terminal device.

Optionally, the periodicity may be preconfigured.

Optionally, the periodicity is variable. In addition, as the terminal device moves away from an edge of the range covered by all the TAs indicated by the second TA information, the periodicity also increases. For example, if a position A is more distant from the edge of the range covered by all the TAs indicated by the second TA information than a position B, a periodicity of determining, by a terminal device at the position A, a position of the terminal device is greater than a periodicity of determining, by a terminal device at the position B, a position of the terminal device.

In another example, the terminal device may determine the position of the terminal device when detecting the cell ID change. In other words, when a cell in which the terminal device is located changes, the terminal device determines the position of the terminal device.

There are many methods for determining, by the terminal device, the position of the terminal device. This is not specifically limited in this embodiment of this application. The methods include, for example, global positioning system (global positioning system, GPS) positioning and base station positioning.

In some embodiments, the core network device restarts a TA configuration procedure for the terminal device when a minimum distance between the position of the terminal device and the range covered by all the TAs indicated by the second TA information is greater than or equal to a preset threshold.

For example, the TA is the circle. The core network device may determine a difference between a distance between the position of the terminal device and a center of a circle of each of all the TAs indicated by the second TA information and a radius of the TA. When all obtained differences are greater than a preset threshold, the core network device resets a TA based on a TA setting parameter, and restarts to record the position of the terminal device and the TA. Alternatively, the core network device may compare a radius of the TA corresponding to the position of the terminal device with a maximum preset radius. When the radius of the TA corresponding to the position of the terminal device is greater than the maximum preset radius, the core network device resets a TA based on the TA setting parameter, and restarts to record the position of the terminal device and the TA.

In other words, a maximum tracking area is set for the terminal device. If the tracking area of the terminal device is beyond the maximum tracking area (for example, the terminal device roams), the core network device may reset a TA based on the TA setting parameter. In this way, a problem of excessively high paging costs caused by an excessively large tracking area of the terminal device can be avoided.

In some embodiments, the indication information sent by the terminal device to the core network device includes the position of the terminal device. In this case, the core network device determines, based on the position of the terminal device, the TA corresponding to the position.

Specifically, the terminal device sends a position update request to the core network device, where the position of the terminal device is carried in the position update request. After receiving the position update request sent by the terminal device, the core network device determines, based on the position carried in the position update request and a historical position of the terminal device, the TA corresponding to the position, and records the position sent by the terminal device this time and the TA corresponding to the position.

Optionally, in an attach process of the terminal device, the indication information is carried in an attach request sent by the terminal device to the core network device. Optionally, the attach request sent by the terminal device may further include the type of the terminal device, and the core network device determines, based on the position of the terminal device and the type of the terminal device, the TA corresponding to the position of the terminal device.

The type of the terminal device may be a fixed terminal device (fixed terminal, FT) or a mobile terminal device (mobile terminal, MT). A range of a TA of a terminal device of the FT type may be less than or equal to a range of a TA of a terminal device of the MT type.

Optionally, the first TA of the terminal device in each attach process may use the position of the terminal device as a center of a circle.

Optionally, before an attach procedure starts, the terminal device may further determine a tracking area determining manner of the terminal device based on broadcast information sent by the access network device.

For example, a TA algorithm parameter is added to the broadcast information, and using the TA algorithm parameter may indicate that a TA algorithm of a terrestrial network is preferentially used by default, a TA algorithm based on the position of the terminal device is preferentially used by default, or the like.

Optionally, the core network device determines one or more cells in the TA corresponding to the position. When the terminal device needs to be paged, the core network device performs paging in the one or more cells. It may be understood that, in the NTN scenario, the core network device further needs to determine a cell (for example, obtained by calculating a satellite beam) of the access network device carried on the air-borne platform.

It may be understood that, when the terminal device is within the service range of the load that is carried by the air-borne platform and that has the function of the access network device, the terminal device communicates with the core network device by using the air-home platform. For example, the terminal device sends the attach request, the position update request, and the like to the core network device by using the load that is carried by the air-borne platform and that has the function of the access network device. Similarly, the core network device sends an attach response, a position update response, a paging message, and the like to the terminal device by using the load that is carried by the air-borne platform and that has the function of the access network device.

Figure 4:
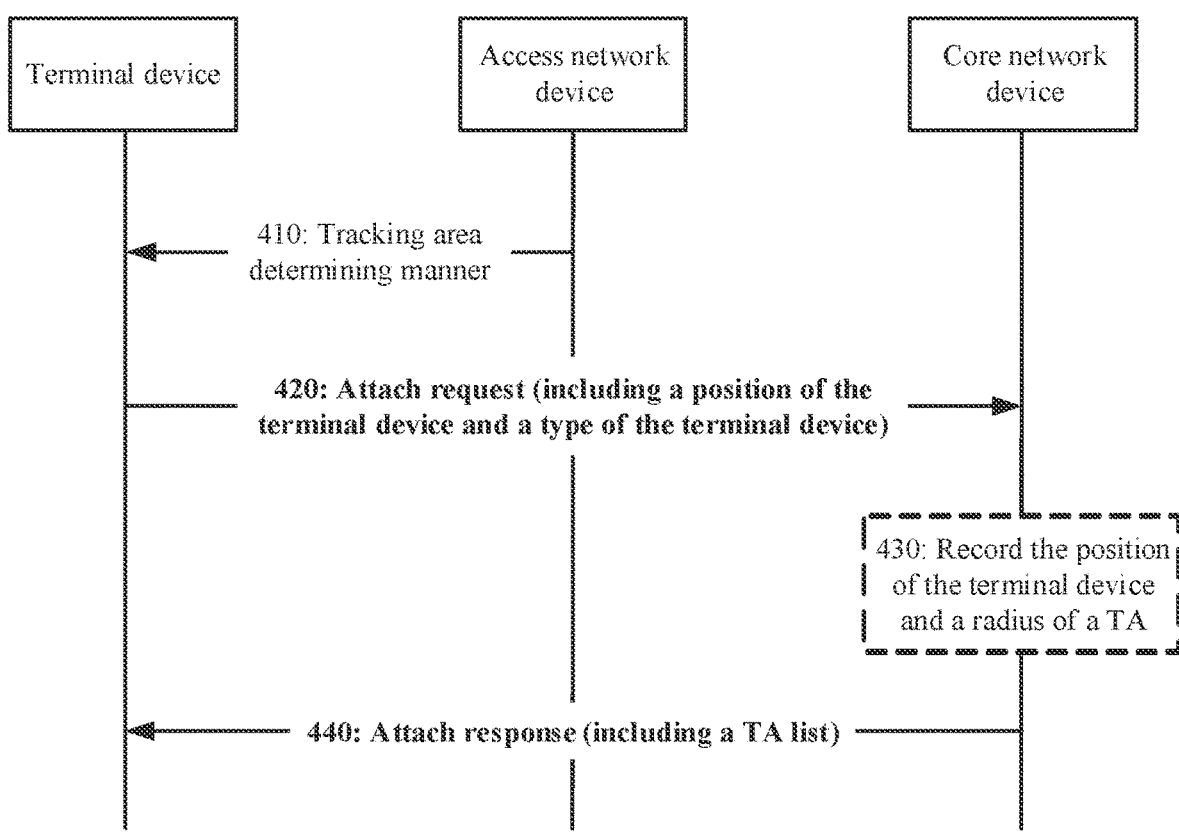
FIG. 4 is a schematic diagram of an attach procedure in which a core network device determines a tracking area.

FIG. 4 is a schematic diagram of an attach procedure in which a core network device determines a tracking area. In FIG. 4, an example in which a TA is a circle is used, and an example in which a representation form of the TA is a center of the circle and a radius is used.

As shown in FIG. 4, in 410, an access network device system delivers and notifies a tracking area determining manner of a terminal device in a broadcasting manner. For example, the access network device system notifies the terminal device to use a user-defined TA to perform position update (where a terminal device having a positioning capability may choose to use a self-defining TA determining manner to perform position update).

In 420, the terminal device sends an attach request (attach request) to the core network device, where the attach request includes a position of the terminal device and a type of the terminal device. Optionally, the terminal device may add an access point position information element (access point position IF) to the attach request, to report the position of the terminal device. FT or MT information may be added to the attach request and sent to the core network device. In this way, the core network device may feed back a track radius (track radius) (where a radius corresponding to the FT is smaller, and a radius corresponding to the MT is larger) based on an FT or MT attribute of the terminal device, and define a TA that uses the position of the terminal device as a center of a circle.

The access point position information element may include a latitude sign (latitude sign), a degree of latitude (degrees of latitude), a degree of longitude (degrees of longitude), a direction of altitude (direction of altitude), the altitude (altitude), and the like of the terminal device.

Optionally, after 420, the core network device may perform 430. In 430, the core network device records the position of the terminal device and the radius of the TA.

In step 440, the core network device sends the attach response to the terminal device, and feeds back a TA list. The TA list includes the TA that uses the position of the terminal device as the center of the circle. Optionally, an expression form of the TA may be added to the attach response. That is, the access point position information element (used to indicate a position of the center of the circle of the TA) and the track radius (used to indicate the track radius of the TA) are added.

The access point position information element may include the latitude sign, the degree of the latitude, the degree of the longitude, the direction of the altitude, the altitude, and the like of the terminal device.

Figure 5:
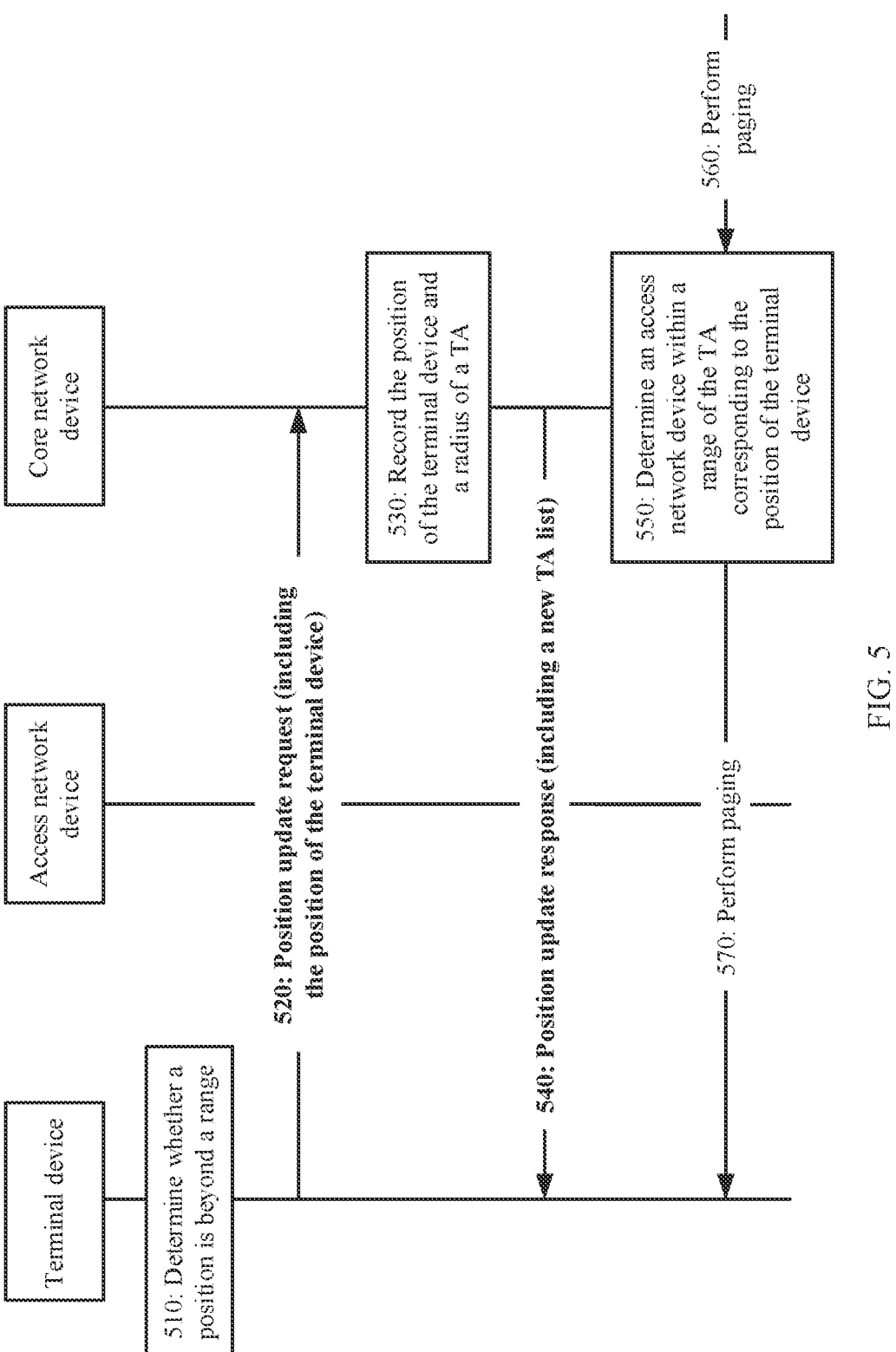
FIG. 5 is a schematic diagram of a position update procedure in which a core network device determines a tracking area.

FIG. 5 is a schematic diagram of a position update procedure in which a core network device determines a tracking area. In FIG. 5, an example in which a TA is a circle is also used, and an example in which a representation form of the TA is a center of the circle and a radius is also used.

As shown in FIG. 5, in 510, a terminal device detects whether the terminal device has moved out of a range of a TA indicated by second TA information. For example, the terminal device may periodically determine a position of the terminal device, and determine whether the position of the terminal device moves out of the range covered by the TA indicated by the second TA information.

Optionally, the periodicity is variable. In addition, as the terminal device moves away from an edge of a range covered by all TAs indicated by the second TA information, the periodicity also increases. For example, if a position A is more distant from the edge of the range covered by all the TAs indicated by the second TA information than a position B, a periodicity of determining, by a terminal device at the position A, a position of the terminal device is greater than a periodicity of determining, by a terminal device at the position B, a position of the terminal device.

In 520, when detecting that the terminal device has moved out of the range of the TA indicated by the second TA information, the terminal device sends a position update request to the core network device, and reports the position of the terminal device, to perform position update. Optionally, the terminal device may add an access point position information element (access point position IE) to the position update request, to report the position of the terminal device.

The access point position information element may include a latitude sign, a degree of latitude, a degree of longitude, a direction of altitude, the altitude, and the like of the terminal device.

In 530, the core network device determines a TA corresponding to the position of the terminal device, and updates a TA list.

The core network device may further record the position of the terminal device. The position (for example, as input information for performing a minimum circle coverage algorithm) of the terminal device may be used to determine the TA. Optionally, an expression form of the TA may be added to a position update response. That is, the access point position information element (used to indicate a position of a center of a circle of the TA) and a track radius (used to indicate the track radius of the TA) are added.

The access point position information element may include the latitude sign, the degree of the latitude, the degree of the longitude, the direction of the altitude, the altitude, and the like of the terminal device.

In 540, the core network device sends the position update response to the terminal device, where the position update response includes a new TA list.

In 550, the core network device determines an access network device within a range of the TA corresponding to the position of the terminal device. Specifically, the core network device determines the access network device within the range based on TA information maintained by the core network device. It should be understood that the access network device within the range of the TA includes an air-borne platform (for example, determined by calculating a satellite beam) that carries a function of the access network device and an access network device disposed on the around.

When the core network device performs 560, to be specific, when the core network device receives a paging message for the terminal device, 570 is performed.

In 570, user paging is performed within the range of the TA corresponding to the position of the terminal device. Specifically, the paging message is sent to the terminal device by using the access network device obtained in 550 through determining.

In some other embodiments, indication information sent by the terminal device to the core network device includes the TA corresponding to the position of the terminal device. In this case, the terminal device determines, based on the position of the terminal device, the TA corresponding to the position.

Specifically, the terminal device determines the position of the terminal device, and determines, based on the position of the terminal device, the TA corresponding to the position of the terminal device. When the position of the terminal device is beyond the range covered by the TA indicated by the second TA information, the terminal device sends the position update request to the core network device, where the TA corresponding to the position of the terminal device is carried in the position update request. After receiving the position update request sent by the terminal device, the core network device updates the second TA information.

Optionally, in an attach process of the terminal device, the TA corresponding to the position of the terminal device is carried in an attach request sent by the terminal device to the core network device. Optionally, the terminal device may determine, based on the position of the terminal device and a type of the terminal device, the TA corresponding to the position of the terminal device.

The type of the terminal device may be a fixed terminal device (fixed terminal, FT) or a mobile terminal device (mobile terminal, MT). A range of a TA of a terminal device of the FT type may be less than or equal to a range of a TA of a terminal device of the MT type.

Optionally, the first TA of the terminal device in each attach process may use the position of the terminal device as a center of a circle.

Optionally, before an attach procedure starts, the terminal device may further determine a tracking area determining manner of the terminal device and a TA setting parameter based on broadcast information sent by the access network device.

For example, a TA algorithm parameter is added to the broadcast information, and using the TA algorithm parameter may indicate that a TA algorithm of a terrestrial network is preferentially used by default, a TA algorithm based on the position of the terminal device is preferentially used by default, or the like.

The TA setting parameter may be a minimum reference radius, a maximum reference radius, or the like.

Optionally, the core network device determines one or more cells in the TA corresponding to the position. When the terminal device needs to be paged, the core network device performs paging in the one or more cells. It may be understood that, in an NTN scenario, the core network device further needs to determine a cell (for example, obtained by calculating a satellite beam) that is in the TA corresponding to the position of the terminal device and that is of the access network device carried on the air-borne platform.

It may be understood that, when the terminal device is within a service range of load that is carried by the air-borne platform and that has the function of the access network device, the terminal device communicates with the core network device by using the air-borne platform. For example, the terminal device sends the attach request, the position update request, and the like to the core network device by using the load that is carried by the air-borne platform and that has the function of the access network device. Similarly, the core network device sends an attach response, the position update response, the paging message, and the like to the terminal device by using the carried load having the function of the access network device.

Figure 6:
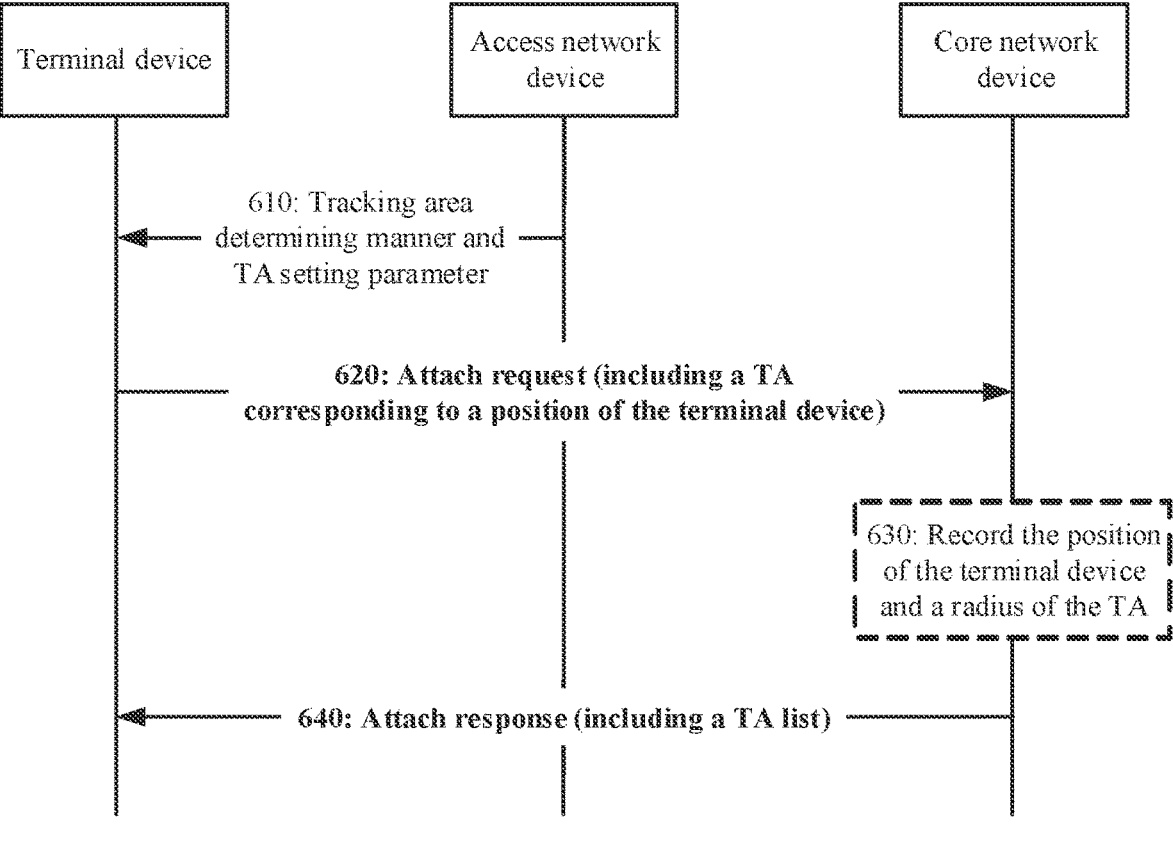
FIG. 6 is a schematic diagram of an attach procedure in which a terminal device determines a tracking area.

FIG. 6 is a schematic diagram of an attach procedure in which a terminal device determines a tracking area. In FIG. 6, an example in which a TA is a circle is also used, and an example in which a representation form of the TA is a center of the circle and a radius is also used.

As shown in FIG. 6, in 610, an access network device delivers and notifies a tracking area determining manner of the terminal device and a radius (for example, a minimum reference radius) in a broadcasting manner. For example, the access network device notifies the terminal device to use a user-defined TA to perform position update (a terminal device having a positioning capability may choose to use a self-defining TA determining manner to perform position update).

In 620, the terminal device may determine a track radius based on an FT or MT attribute (a radius corresponding to the FT is smaller, and a radius corresponding to the MT is larger) of the terminal device. The terminal device sends an attach request to a core network device, where the attach request includes a center of a circle and a radius of the TA. Optionally, the terminal device may add an expression form of the TA to the attach request, that is, add an access point position information element (used to indicate a position of the center of the circle of the TA) and the track radius (used to indicate the track radius of the TA) to the attach request.

The access point position information element may include a latitude sign, a degree of latitude, a degree of longitude, a direction of altitude, the altitude, and the like of the terminal device.

Optionally, after 620, the core network device may perform 630. In step 630, the core network device records a position of the terminal device and the radius of the TA.

In 640, the core network device sends an attach response to the terminal device, and feeds back a TA list. The TA list includes a TA that uses the terminal device as the center of the circle.

Optionally, an expression form of the TA may be added to the attach response. That is, the access point position information element (used to indicate the position of the center of the circle of the TA) and the track radius (used to indicate the track radius of the TA) are added.

The access point position information element may include the latitude sign, the degree of the latitude, the degree of the longitude, the direction of the altitude, the altitude, and the like of the terminal device.

Figure 7:
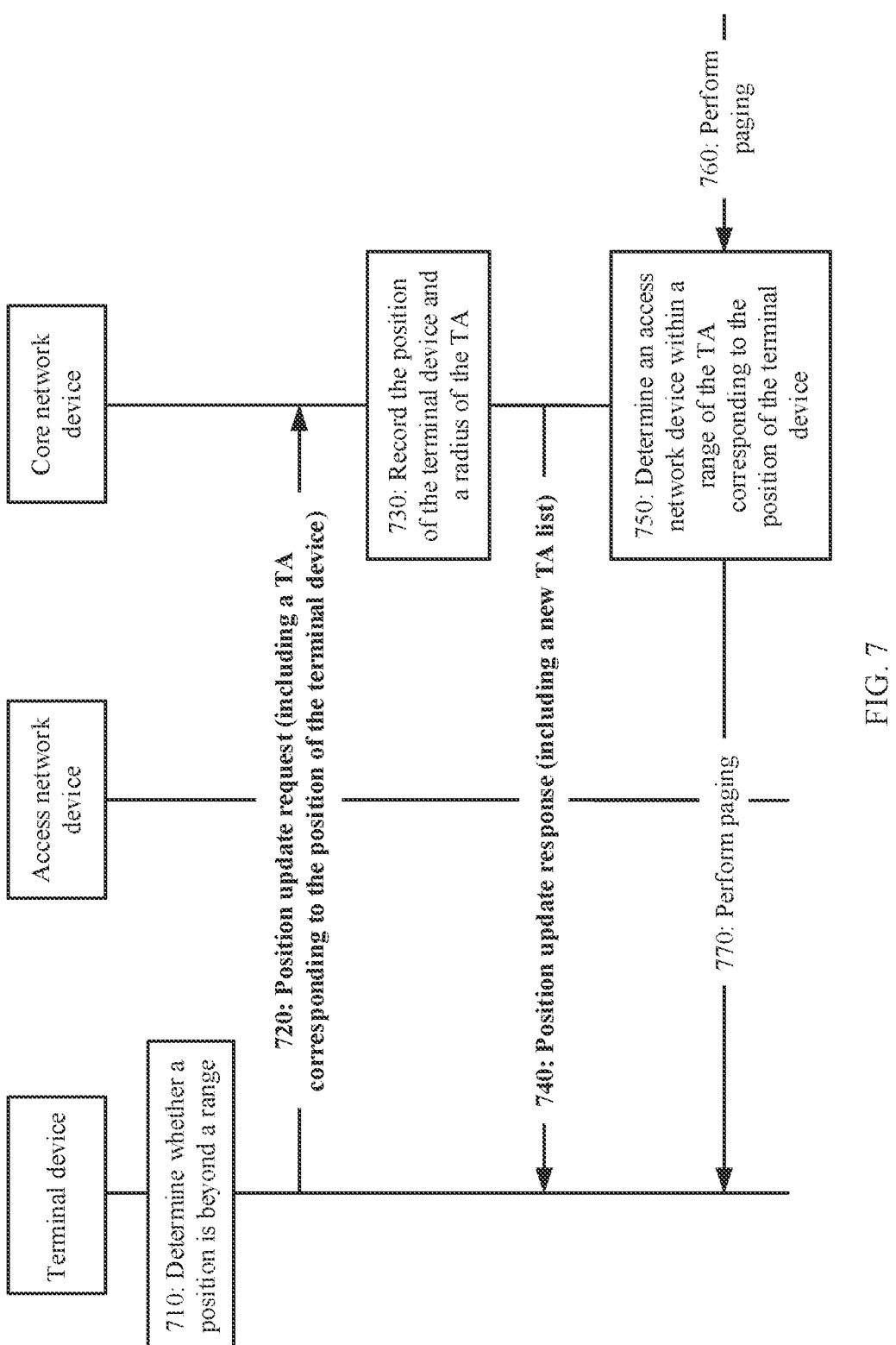
FIG. 7 is a schematic diagram of a position update procedure in which a terminal device determines a tracking area.

FIG. 7 is a schematic diagram of a position update procedure in which a terminal device determines a tracking area. In FIG. 7, an example in which a TA is a circle is also used, and an example in which a representation form of the TA is a center of the circle and a radius is also used.

As shown in FIG. 7, in 710, the terminal device detects whether the terminal device has moved out of a range of a TA indicated by second TA information.

In 720, when detecting that the terminal device has moved out of the range of the TA indicated by the second TA information, the terminal device sends a position update request to a core network device, and reports a TA corresponding to a position of the terminal device, to perform position update.

Optionally, the terminal device may add an expression form of the TA to an attach request, that is, add an access point position information element (used to indicate a position of the center of the circle of the TA) and a track radius (used to indicate the track radius of the TA) to the attach request.

The access point position information element may include a latitude sign, a degree of latitude, a degree of longitude, a direction of altitude, the altitude, and the like of the terminal device.

In 730, the core network device updates a TA list.

The core network device may further record the position of the terminal device and a radius of the TA corresponding to the position of the terminal device.

In 740, the core network device sends a position update response to the terminal device, where the position update response includes a new TA list.

Optionally, an expression form of the TA may be added to the position update response. That is, the access point position information element (used to indicate the position of the center of the circle of the TA) and the track radius (used to indicate the track radius of the TA) are added.

The access point position information element may include the latitude sign, the degree of the latitude, the degree of the longitude, the direction of the altitude, the altitude, and the like of the terminal device.

In 750, the core network device determines an access network device within a range of the TA corresponding to the position of the terminal device. Specifically, the core network device determines the access network device within the range based on TA information maintained by the core network device. It should be understood that the access network device within the range of the TA includes an air-borne platform (for example, determined by calculating a satellite beam) that carries a function of the access network device and an access network device disposed on the ground. When the core network device performs 760, to be specific, when the core network device receives a paging message for the terminal device, 770 is performed.

In 760, user paging is performed within the range of the TA corresponding to the position of the terminal device. Specifically, the paging message is sent to the terminal device by using the access network device obtained in 550 through determining.

There are many methods for determining, by the terminal device and the core network device, the TA corresponding to the position of the terminal device. For example, a minimum circle coverage algorithm is used.

Figure 8:
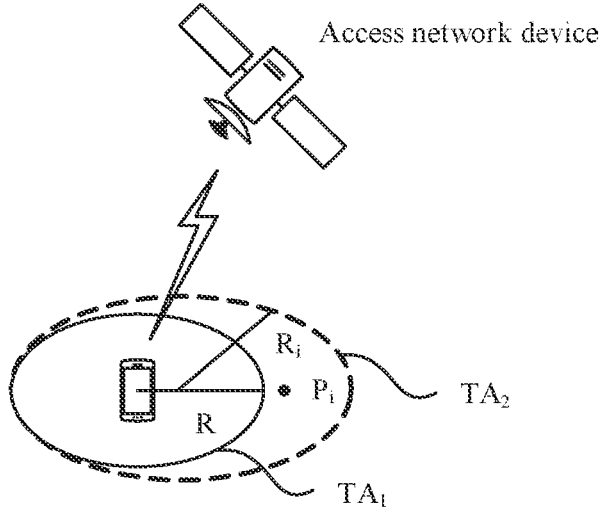
FIG. 8 is a schematic diagram of TA update when a TA is a circle.

The minimum circle coverage algorithm is used as an example to describe the TA determining method in this embodiment of this application. As shown in FIG. 8, a circular area that uses a current position $P_1$ of the terminal device as a center of a circle ($PC_1$) and whose radius is R is used as an initial dynamic $TA_1$ of the terminal device. The terminal device periodically obtains a position. When a distance between the position of the terminal device and a position of the center of the circle of the $TA_1$ exceeds the radius R, it is considered that the terminal device has moved out of the $TA_1$ area, and the terminal device reports the position update request to report a new position $P_1$. The core network device determines a new tracking area $TA_2$ by using the minimum circle coverage algorithm based on the new position and the historical position of the terminal device, the historical center of the circle, and the like, or the terminal device determines the $TA_2$ corresponding to the new position $P_1$, and reports the $TA_2$ to the core network device.

Figure 9:
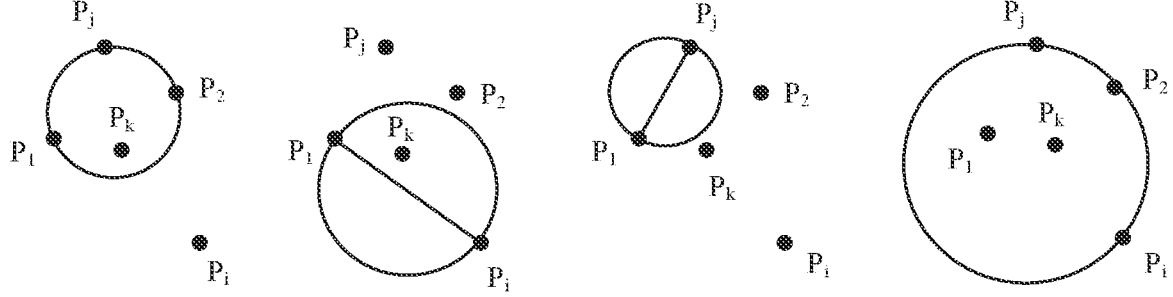
FIG. 9 is a schematic diagram of a minimum circle coverage algorithm.

FIG. 9 is a schematic diagram of a minimum circle coverage algorithm. As shown in FIG. 9, specific steps of determining a $TA_2$ by using the minimum circle coverage algorithm are as follows.

1. Randomly arrange all positions of a terminal device (which can ensure algorithm complexity).

2. Initially, randomly find two positions. It is assumed that the positions are $P_1$ and $P_2$. $P_1P_2$ is used as a diameter to obtain an initial circle, which is set to $C_2$ ($C_i$ represents a smallest circle containing the first i positions).

3. Add positions in sequence. A current position is set to $P_i$. If $P_i$ is in a current circle $C_{i-1}$, $C_i=C_{i-1}$; otherwise, proceed to step 4.

4. Once proceed to step 4, it indicates that a new circle needs to be constructed. It is clear that Pi needs to be on a boundary of the new circle. Simply, $P_1P_i$ is directly used as a diameter to temporarily obtain $C_i$.

5. Find a point $P_j$ (j<i) that is not in $C_i$. Therefore, $P_i$ and $P_j$ need to be on a boundary of a newer circle. In this way, so far, it can be determined that two points ($P_i$ and $P_j$) are on the boundary of the newer circle. Simply, $P_iP_j$ is directly used as a diameter to temporarily obtain $C_j$.

6. Similarly, the newly obtained $C_j$ cannot necessarily contain all points from 1 to j. Continue to find a point $P_k$ (k<j<i) that is not in $C_j$, $P_i$, $P_j$, and $P_k$ need to be on a boundary of a newer circle. It can be determined that there are three points ($P_i$, $P_j$, and $P_k$) on the boundary of the newer circle. Because a circle is determined by using three points, a new circle $C_k$ includes $P_i$, $P_j$, and $P_k$. In addition, the circle needs to cover the first i points.

7. Obtain a new position $PC_k$ of a center of a circle and a new radius $R_k$. The circle may cover all historically reported moving tracks of the terminal device. A guard band radius is added based on the currently obtained $R_k$, to obtain the new tracking area $TA_2$ of the terminal device.

8. Limit a range of the $TA_2$. For a core network device, the core network device may set a maximum tracking range $R_{max}$. If a TA tracking area is beyond $R_{max}$ (for example, a roaming user), a new TA is reset. For the terminal device, the terminal device may limit the range of the $TA_2$ based on $R_{max}$ in the broadcast information sent by an access network device.

The following describes apparatus embodiments in the embodiments of this application with reference to FIG. 10 to FIG. 13.

Figure 10:
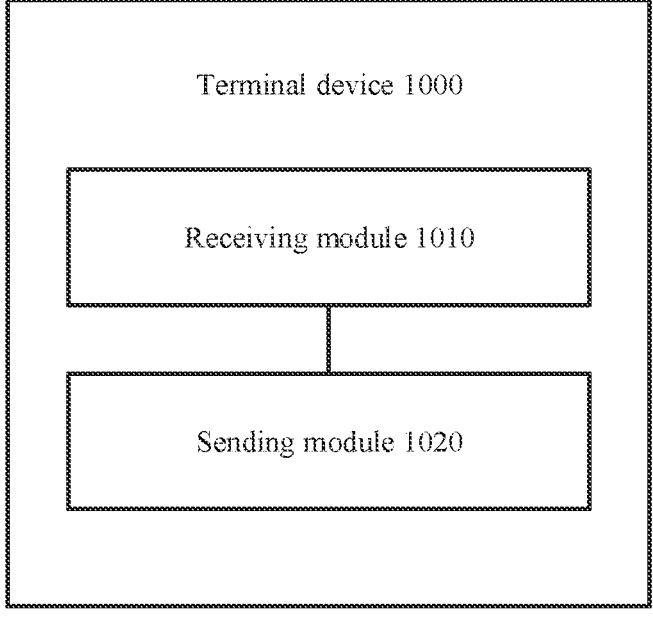
FIG. 10 is a schematic structural diagram of a terminal device according to an embodiment of this application.

FIG. 10 is a schematic structural diagram of a terminal device according to an embodiment of this application. The terminal device 1000 in FIG. 10 may correspond to the foregoing terminal device. As shown in FIG. 10, the terminal device 1000 includes a receiving module 1010 and a sending module 1020.

The sending module 1020 is configured to send indication information to a core network device, where the indication information is used to indicate a position of the terminal device.

The receiving module 1010 is configured to receive first tracking area TA information from the core network device, where the first TA information includes a TA corresponding to the position of the terminal device 1000, and the TA is determined based on the position of the terminal device 1000.

Optionally, the sending module 1020 is specifically configured to send the indication information to the core network device when the position of the terminal device 1000 is beyond a range covered by all TAs indicated by second TA information, where the second TA information is TA information currently used by the terminal device 1000.

Optionally, the sending module 1020 is specifically configured to send a position update request to the core network device, where the position update request includes the indication information.

Optionally, the indication information includes the position of the terminal device 1000; and the receiving module 1010 is further configured to receive broadcast information sent by an access network device, where the broadcast information is used to indicate a TA determining manner of the terminal device 1000.

Optionally, the sending module 1020 is further configured to send a type of the terminal device 1000 to the core network device, where the type is a fixed terminal device FT or a mobile terminal device MT.

Optionally, the indication information includes the TA corresponding to the position of the terminal device 1000; and the terminal device 1000 further includes:

a processing module 1030, configured to: before the terminal device 1000 sends the indication information to the core network device, determine, based on the position of the terminal device 1000, the TA corresponding to the position of the terminal device 1000.

Optionally, the receiving module 1010 is further configured to receive broadcast information sent by an access network device, where the broadcast information is used to indicate a tracking area determining manner of the terminal device 1000 and a TA setting parameter and the processing module 1030 is further configured to determine, based on the position of the terminal device 1000, the determining manner, and the setting parameter, the TA corresponding to the position of the terminal device 1000.

Optionally, the processing module 1030 is specifically configured to determine, based on the position of the terminal device 1000, the determining manner, the setting parameter, and a type of the terminal device 1000, the TA corresponding to the position of the terminal device 1000, where the type is a fixed terminal device FT or a mobile terminal device MT.

Optionally, the processing module 1030 is specifically configured to obtain, by using a minimum circle coverage algorithm for at least a portion of historical positions of the terminal device 1000 and the position of the terminal device 1000, the TA corresponding to the position of the terminal device 1000.

Optionally, the first TA information includes a center and a radius of the TA corresponding to the position of the terminal device 1000, and the second TA information includes a center and a radius of each of all the TAs.

Optionally, TAs indicated by the first TA information and the second TA information are circles or polygons.

The receiving module 1010 and the sending module 1020 may be implemented by a transceiver. The processing module 1030 may be implemented by a processor. For specific functions and beneficial effects of the receiving module 1010, the sending module 1020, and the processing module 1030, refer to the method shown in FIG. 3. Details are not described herein again.

Figure 11:
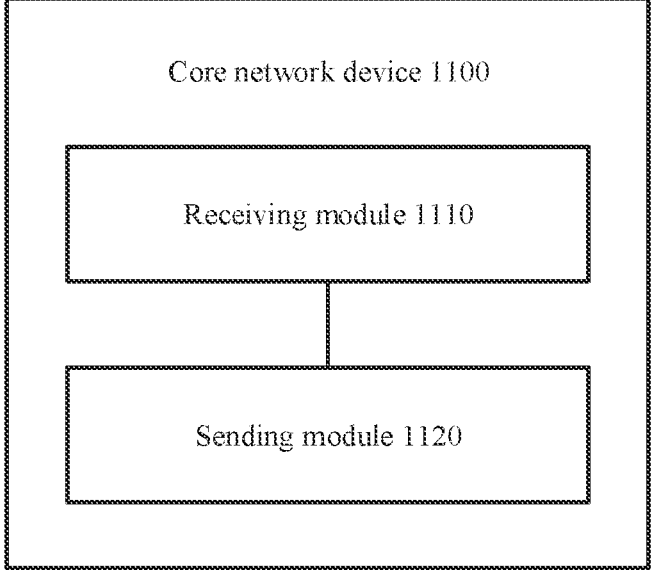
FIG. 11 is a schematic structural diagram of a core network device according to an embodiment of this application.

FIG. 11 is a schematic structural diagram of a core network device according to an embodiment of this application. The core network device 1100 in FIG. 11 may correspond to the foregoing core network device. As shown in FIG. 11, the core network device 1100 includes a receiving module 1110 and a sending module 1120.

The receiving module 1110 is configured to receive indication information sent by a terminal device, where the indication information is used to indicate a position of the terminal device.

The sending module 1120 is configured to send first TA information to the terminal device, where the first TA information includes a TA corresponding to the position of the terminal device, and the TA is determined based on the position of the terminal device.

Optionally, the receiving module 1110 is specifically configured to receive a position update request sent by the terminal device, where the position update request includes the indication information.

Optionally, the core network device 1100 further includes a processing module 1130, configured to restart a TA configuration procedure for the terminal device when a minimum distance between the position of the terminal device and a range covered by all TAs indicated by second TA information is greater than or equal to a preset threshold.

Optionally, the first TA information includes a center and a radius of the TA corresponding to the position of the terminal device, and the second TA information includes a center and a radius of each of all the TAs.

Optionally, TAs indicated by the first TA information and the second TA information are circles or polygons.

Optionally, the processing module 1130 is further configured to determine one or more cells in the TA corresponding to the position of the terminal device; and configured to perform paging in the one or more cells.

Optionally, the indication information includes the position of the terminal device; and the processing module 1130 is further configured to determine, based on the position of the terminal device, the TA corresponding to the position of the terminal device.

Optionally, the processing module 1130 is specifically configured to obtain, by using a minimum circle coverage algorithm for at least a portion of all historical positions reported by the terminal device and the position of the terminal device, the TA corresponding to the position of the terminal device.

Optionally, the receiving module 1110 is further configured to receive a type of the terminal device sent by the terminal device, where the type is a fixed terminal device FT or a mobile terminal device MT; and the processing module 1130 is further configured to determine, based on the position of the terminal device and the type of the terminal device, the TA corresponding to the position of the terminal device.

The receiving module 1110 and the sending module 1120 may be implemented by a transceiver. The processing module 1130 may be implemented by a processor. For specific functions and beneficial effects of the receiving module 1110, the sending module 1120, and the processing module 1130, refer to the method shown in FIG. 3. Details are not described herein again.

Figure 12:
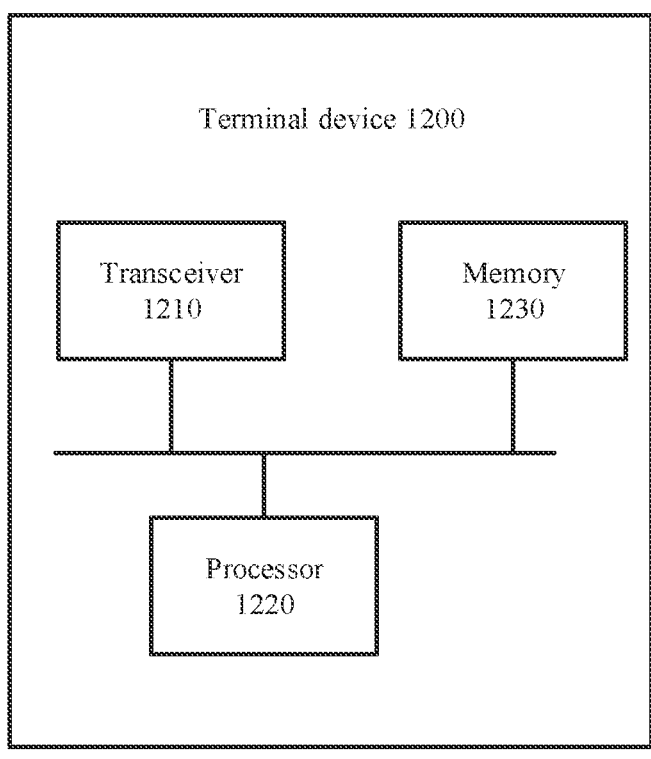
FIG. 12 is a schematic structural diagram of a terminal device according to another embodiment of this application.

FIG. 12 is a schematic structural diagram of a terminal device according to another embodiment of this application. The terminal device 1200 in FIG. 12 may correspond to the foregoing terminal device. As shown in FIG. 12, the terminal device 1200 includes a transceiver 1210, a processor 1220, and a memory 1230.

FIG. 12 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

The transceiver 1210, the processor 1220, and the memory 1230 communicate with each other through an internal connection path, to transfer a control signal and/or a data signal.

Specifically, the transceiver 1210 is configured to: send indication information to a core network device, where the indication information is used to indicate a position of the terminal device; and receive first tracking area TA information from the core network device, where the first TA information includes a TA corresponding to the position of the terminal device, and the TA is determined based on the position of the terminal device.

For a specific working process and beneficial effects of the terminal device 1200, refer to the descriptions in the embodiment shown in FIG. 3. Details are not described herein again.

Figure 13:
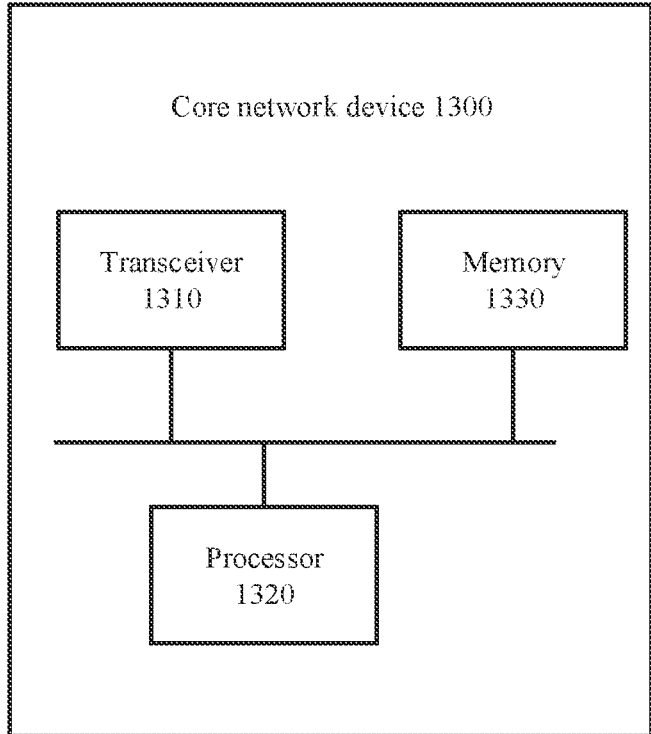
FIG. 13 is a schematic structural diagram of a core network device according to another embodiment of this application.

FIG. 13 is a schematic structural diagram of a core network device according to another embodiment of this application. The core network device 1300 in FIG. 13 may correspond to the foregoing core network device. As shown in FIG. 13, the core network device 1300 includes a transceiver 1310, a processor 1320, and a memory 1330.

FIG. 13 shows only one memory and one processor. In an actual core network device product, there may be one or more processors and one or more memories. The memory may also be referred to as a storage medium, a storage device, or the like. The memory may be disposed independent of the processor, or may be integrated with the processor. This is not limited in this embodiment of this application.

The transceiver 1310, the processor 1320, and the memory 1330 communicate with each other through an internal connection path, to transfer a control signal and/or a data signal.

Specifically, the transceiver 1310 is configured to receive indication information sent by a terminal device, where the indication information is used to indicate a position of the terminal device; and send first TA information to the terminal device, where the first TA information includes a TA corresponding to the position of the terminal device, and the TA is determined based on the position of the terminal device.

For a specific working process and beneficial effects of the core network device 1300, refer to descriptions in the embodiment shown in FIG. 3. Details are not described herein again.

The transceiver in the embodiments of this application may also be referred to as a transceiver unit, a transceiver, a transceiver apparatus, or the like. The processor may also be referred to as a processing unit, a processing board, a processing module, a processing apparatus, or the like. Optionally, a component that is in the transceiver and that is configured to implement a receiving function may be considered as a receiving unit, and a component that is in the transceiver and that is configured to implement a sending function may be considered as a sending unit. That is, the transceiver includes the receiving unit and the sending unit. The receiving unit may also be sometimes referred to as a receiver, a receiver, a receiving circuit, or the like. The sending unit may also be sometimes referred to as a transmitter, a transmitter, a transmitting circuit, or the like.

The memory in the embodiments of this application is configured to store computer instructions and a parameter for running the processor.

The processor in the embodiments of this application may be an integrated circuit chip, and is capable of signal processing. In an implementation process, steps in the foregoing methods can be completed by using a hardware integrated logical circuit in the processor, or by using instructions in a form of software. The processor in the embodiments of this application may be a general purpose processor, a digital signal processor (digital signal processor, DSP), an application specific integrated circuit (application specific integrated circuit, ASIC), a field programmable gate array (field programmable gate array, FPGA) or another programmable logic device, a discrete gate or a transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory (random access memory, RAM), a flash memory, a read-only memory (read-only memory, ROM), a programmable read-only memory, an electrically erasable programmable memory, or a register. The storage medium is located in the memory, and a processor reads instructions in the memory and completes the steps in the foregoing methods in combination with hardware of the processor.

Sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid-state drive (solid state disk, SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A tracking area (TA) determining method, comprising:
receiving, by a terminal device, broadcast information sent by an access network device, wherein the broadcast information indicates to the terminal device whether to use a user-defined TA determining manner to perform position update;
sending, by the terminal device, indication information to a core network device, wherein the indication information comprises geographic information of a position of the terminal device, wherein the geographic information comprises at least one of latitude information, longitude information, or altitude information, and the geographic information is determined by the terminal device, wherein the sending, by the terminal device, indication information to the core network device comprises:
sending, by the terminal device, the indication information to the core network device when the position of the terminal device is beyond a range covered by a plurality of TAs indicated by second TA information, wherein the second TA information comprises a center of a circle and a radius of each of the plurality of TAs, and wherein the second TA information is TA information currently used by the terminal device, and wherein a periodicity of determining the position of the terminal device is determined based on the second TA information, and wherein the periodicity of determining the position of the terminal device is increased when a distance between the terminal device and an edge of the range increases, wherein the edge of the range is determined by the center of the circle and the radius of each of the plurality of TAs in the second TA information; and
receiving, by the terminal device and in response to the at least one of latitude information, longitude information, or altitude information comprised in the geographic information, first TA information from the core network device, wherein the first TA information comprises a TA corresponding to the geographic information of the position of the terminal device.

2. The method according to claim 1, wherein the sending, by a terminal device, indication information to a core network device comprises:
sending, by the terminal device, a position update request to the core network device, wherein the position update request comprises the indication information.

3. The method according to claim 1, wherein the indication information comprises the TA corresponding to the position of the terminal device;
and before the sending, by the terminal device, indication information to the core network device, the method further comprises:
determining, by the terminal device based on the position of the terminal device, the TA corresponding to the position of the terminal device.

4. The method according to claim 3, wherein the broadcast information indicates a TA setting parameter, and wherein the method further comprises:
determining, by the terminal device based on the position of the terminal device, a TA determining manner, the TA setting parameter, and the TA corresponding to the position of the terminal device.

5. The method according to claim 3, wherein the determining, by the terminal device based on the position of the terminal device, the TA corresponding to the position of the terminal device comprises:
obtaining, by the terminal device by using a minimum circle coverage algorithm for at least a portion of historical positions of the terminal device and the position of the terminal device, the TA corresponding to the position of the terminal device.

6. The method according to claim 1, wherein the first TA information comprises a center of a circle and a radius of the TA corresponding to the position of the terminal device.

7. A tracking area determining method, comprising:
receiving, by a core network device, indication information sent by a terminal device, wherein the indication information comprises geographic information of a position of the terminal device, wherein the geographic information comprises at least one of latitude information, longitude information, or altitude information, and the geographic information is determined by the terminal device, wherein the indication information is sent when the position of the terminal device is beyond a range covered by a plurality of TAs indicated by second TA information, wherein the second TA information comprises a center of a circle and a radius of each of the plurality of TAS, and wherein the second TA information is TA information currently used by the terminal device, and wherein a periodicity of determining the position of the terminal device is determined based on the second TA information, and wherein the periodicity of determining the position of the terminal device is increased when a distance between the terminal device and an edge of the range increases, wherein the edge of the range is determined by the center of the circle and the radius of each of the plurality of TAs in the second TA information;

determining, by the core network device based on the at least one of latitude information, longitude information, or altitude information comprised in the geographic information, a TA corresponding to the position of the terminal device; and in response to the geographic information, sending, by the core network device, first TA information to the terminal device, wherein the first TA information comprises the TA corresponding to the geographic information of the position of the terminal device.

8. The method according to claim 7, wherein the receiving, by a core network device, indication information sent by a terminal device comprises:

receiving, by the core network device, a position update request sent by the terminal device, wherein the position update request comprises the indication information.

9. The method according to claim 8, wherein the first TA information comprises a center of a circle and a radius of the TA corresponding to the position of the terminal device.

10. The method according to claim 7, wherein the method further comprises:

determining, by the core network device, one or more cells in the TA corresponding to the position of the terminal device; and performing, by the core network device, paging in the one or more cells.

11. The method according to claim 7, wherein the determining, by the core network device based on the at least one of latitude information, longitude information, or altitude information comprised in the geographic information, the TA corresponding to the position of the terminal device comprises:

obtaining, by the core network device by using a minimum circle coverage algorithm for at least a portion of historical positions reported by the terminal device and the position of the terminal device, the TA corresponding to the position of the terminal device.

12. A terminal device, comprising at least one processor, wherein the at least one processor is coupled to at least one memory storing programming instructions executable by the at least one processor to perform operations comprising:

receiving broadcast information sent by an access network device, wherein the broadcast information indicates to the terminal device whether to use a user-defined TA determining manner to perform position update;

sending indication information to a core network device, wherein the indication information comprises geographic information of a position of the terminal device, wherein the geographic information comprises at least one of latitude information, longitude information, or altitude information, and the geographic information is determined by the terminal device, wherein the sending, by the terminal device, indication information to the core network device comprises:

sending, by the terminal device, the indication information to the core network device when the position of the terminal device is beyond a range covered by a plurality of TAs indicated by second TA information, wherein the second TA information comprises a center of a circle and a radius of each of the plurality of TAS, and wherein the second TA information is TA information currently used by the terminal device, and wherein a periodicity of determining the position of the terminal device is determined based on the second TA information, and wherein the periodicity of determining the position of the terminal device is increased when a distance between the terminal device and an edge of the range increases, wherein the edge of the range is determined by the center of the circle and the radius of each of the plurality of TAs in the second TA information; and in response to the at least one of latitude information, longitude information, or altitude information comprised in the geographic information, receiving first TA information from the core network device, wherein the first TA information comprises a TA corresponding to the geographic information of the position of the terminal device.

13. The terminal device according to claim 12, wherein the operations further comprise:

sending a position update request to the core network device, wherein the position update request comprises the indication information.

14. The terminal device according to claim 12, wherein the indication information comprises the TA corresponding to the position of the terminal device; and the operations further comprise:

before the terminal device sends the indication information to the core network device, determining, based on the position of the terminal device, the TA corresponding to the position of the terminal device.

15. The terminal device according to claim 14, wherein the broadcast information indicates a TA setting parameter, and wherein the operations further comprise:

determining, based on the position of the terminal device, the TA determining manner, the TA setting parameter, and the TA corresponding to the position of the terminal device.

16. The terminal device according to claim 14, wherein the determining, by the terminal device based on the position of the terminal device, the TA corresponding to the position of the terminal device comprises:

obtaining, by the terminal device by using a minimum circle coverage algorithm for at least a portion of historical positions of the terminal device and the position of the terminal device, the TA corresponding to the position of the terminal device.

17. The terminal device according to claim 12, wherein the first TA information comprises a center of a circle and a radius of the TA corresponding to the position of the terminal device.

* * * * *